(12) United States Patent
Lim et al.

(10) Patent No.: US 10,491,001 B2
(45) Date of Patent: Nov. 26, 2019

(54) METHOD AND APPARATUS FOR CONTROLLING POWER SUPPLY

(71) Applicant: Samsung Electronics Co., Ltd., Suwon-si, Gyeonggi-do (KR)

(72) Inventors: Hunjung Lim, Suwon-si (KR); Kyungjae Kim, Suwon-si (KR); Kwanwoo Song, Yongin-si (KR); Hyejung Cho, Anyang-si (KR); Jeongil Seo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 15/575,497

(22) PCT Filed: May 27, 2016

(86) PCT No.: PCT/KR2016/005622
§ 371 (c)(1),
(2) Date: Nov. 20, 2017

(87) PCT Pub. No.: WO2016/195327
PCT Pub. Date: Dec. 8, 2016

(65) Prior Publication Data
US 2018/0183238 A1    Jun. 28, 2018

(30) Foreign Application Priority Data

May 29, 2015    (KR) .................... 10-2015-0076680

(51) Int. Cl.
*G05B 19/042*    (2006.01)
*H02J 3/14*    (2006.01)

(52) U.S. Cl.
CPC .............. *H02J 3/14* (2013.01); *G05B 19/042* (2013.01); *G05B 2219/2639* (2013.01);
(Continued)

(58) Field of Classification Search
CPC .................... G05B 19/042; H02J 3/14
(Continued)

(56) References Cited

U.S. PATENT DOCUMENTS

| 4,181,950 A * | 1/1980 | Carter, II ........... G01R 21/1333 307/35 |
| 8,332,666 B2 * | 12/2012 | Boss ........................ H02J 3/14 713/300 |

(Continued)

FOREIGN PATENT DOCUMENTS

| EP | 2 375 527 A2 | 10/2011 |
| GB | 2483304 A | 3/2012 |

(Continued)

*Primary Examiner* — William Hernandez
(74) *Attorney, Agent, or Firm* — Jefferson IP Law, LLP

(57) ABSTRACT

The present invention relates to power supply control and, more particularly, to a method and apparatus for simultaneously or individually supplying power to multiple connected devices. A method for managing power supply to a device according to an embodiment of the present invention comprises the steps of: measuring power consumption of at least one connected device; when the measured power consumption exceeds an allowed power supply level, determining the priority of each of the at least one connected device; and controlling power supply to each of the at least one connected device on the basis of the determined priority, wherein the priority of each of the at least one connected device is determined on the basis of the power consumption pattern and connected time of the corresponding connected device. The present invention relates to a technology for a sensor network, machine-to-machine (M2M), machine type communication (MTC), and the Internet of things (IoT). The present disclosure may be used for intelligent services (smart home, smart building, smart city, smart car or con- (Continued)

nected car, healthcare, digital education, retail, security and safety-related service, and the like) on the basis of the technology.

15 Claims, 8 Drawing Sheets

(52) U.S. Cl.
CPC ..... *H02J 2003/143* (2013.01); *Y02B 70/3225* (2013.01); *Y02B 70/3266* (2013.01); *Y04S 20/222* (2013.01); *Y04S 20/224* (2013.01); *Y04S 20/242* (2013.01)

(58) Field of Classification Search
USPC .......................................................... 307/31
See application file for complete search history.

(56) References Cited

U.S. PATENT DOCUMENTS

| | | | |
|---|---|---|---|
| 9,203,240 B2* | 12/2015 | Bae | H02J 3/14 |
| 9,267,971 B2* | 2/2016 | Nebu | G06Q 50/06 |
| 2004/0220702 A1* | 11/2004 | Matsubara | H02J 3/14 |
| | | | 700/291 |
| 2010/0174935 A1* | 7/2010 | Kim | G03G 15/5004 |
| | | | 713/324 |
| 2011/0049984 A1 | 3/2011 | Son | |
| 2011/0251731 A1 | 10/2011 | Yang et al. | |
| 2012/0059531 A1 | 3/2012 | Marivoet et al. | |
| 2012/0101646 A1* | 4/2012 | Nydegger | G05B 15/02 |
| | | | 700/291 |
| 2012/0101652 A1 | 4/2012 | Shin et al. | |
| 2012/0197448 A1* | 8/2012 | Shin | G06Q 10/06 |
| | | | 700/286 |
| 2012/0303987 A1* | 11/2012 | Lee | H02J 3/14 |
| | | | 713/320 |
| 2012/0330473 A1 | 12/2012 | Meredith et al. | |
| 2013/0151024 A1 | 6/2013 | Bae et al. | |
| 2014/0074307 A1* | 3/2014 | Matsuyama | G06Q 50/06 |
| | | | 700/295 |
| 2014/0340075 A1* | 11/2014 | Doi | G01D 4/002 |
| | | | 324/113 |
| 2014/0371942 A1* | 12/2014 | Matsuyama | H02J 3/14 |
| | | | 700/297 |
| 2016/0216698 A1* | 7/2016 | Yoshida | G01R 22/061 |
| 2017/0174090 A1* | 6/2017 | Lakamp | H02J 3/383 |
| 2018/0131187 A1* | 5/2018 | Batzler | H02J 3/14 |

FOREIGN PATENT DOCUMENTS

| | | |
|---|---|---|
| JP | 2004-274938 A | 9/2004 |
| JP | 2007-123191 A | 5/2007 |
| JP | 2012-203991 A | 10/2012 |
| KR | 10-0760279 B1 | 9/2007 |
| KR | 10-2012-0040315 A | 4/2012 |
| KR | 10-1198475 B1 | 10/2012 |
| KR | 10-1233208 B1 | 2/2013 |
| KR | 10-2014-0126193 A | 10/2014 |
| KR | 10-2014-0126934 A | 11/2014 |

* cited by examiner

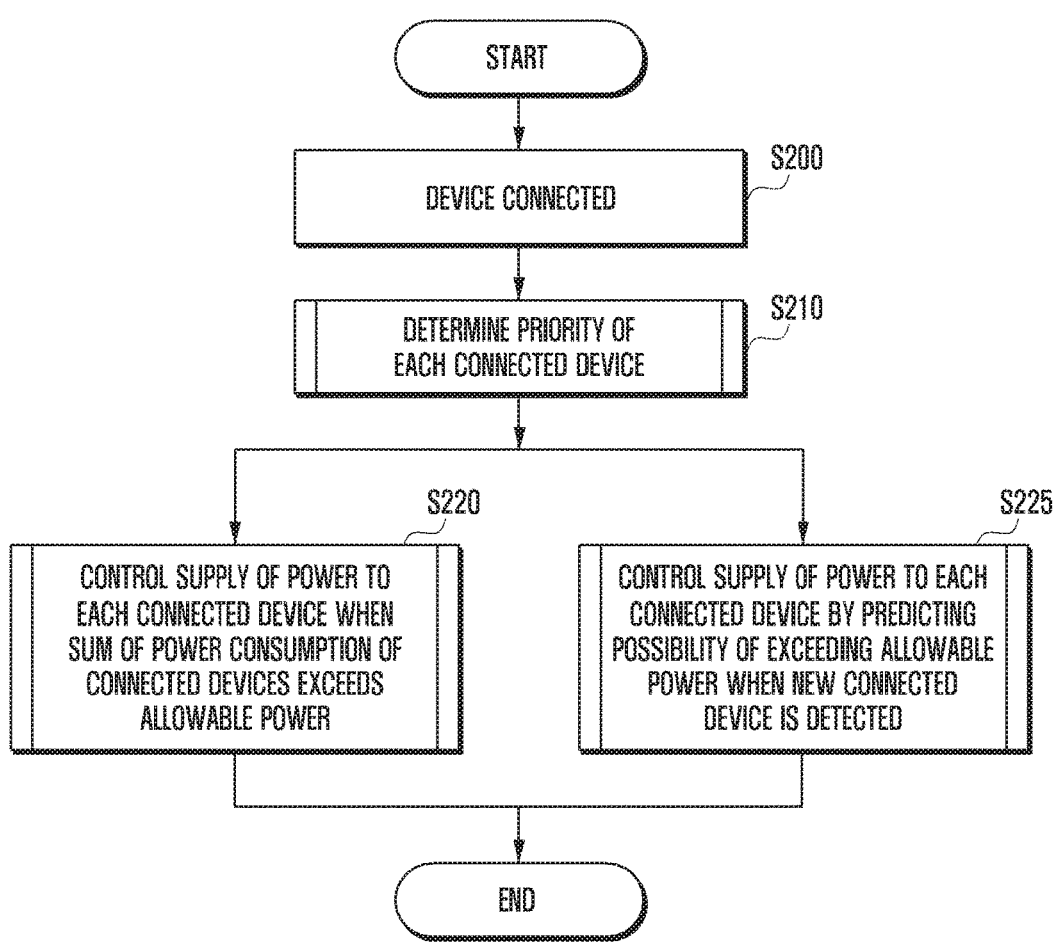

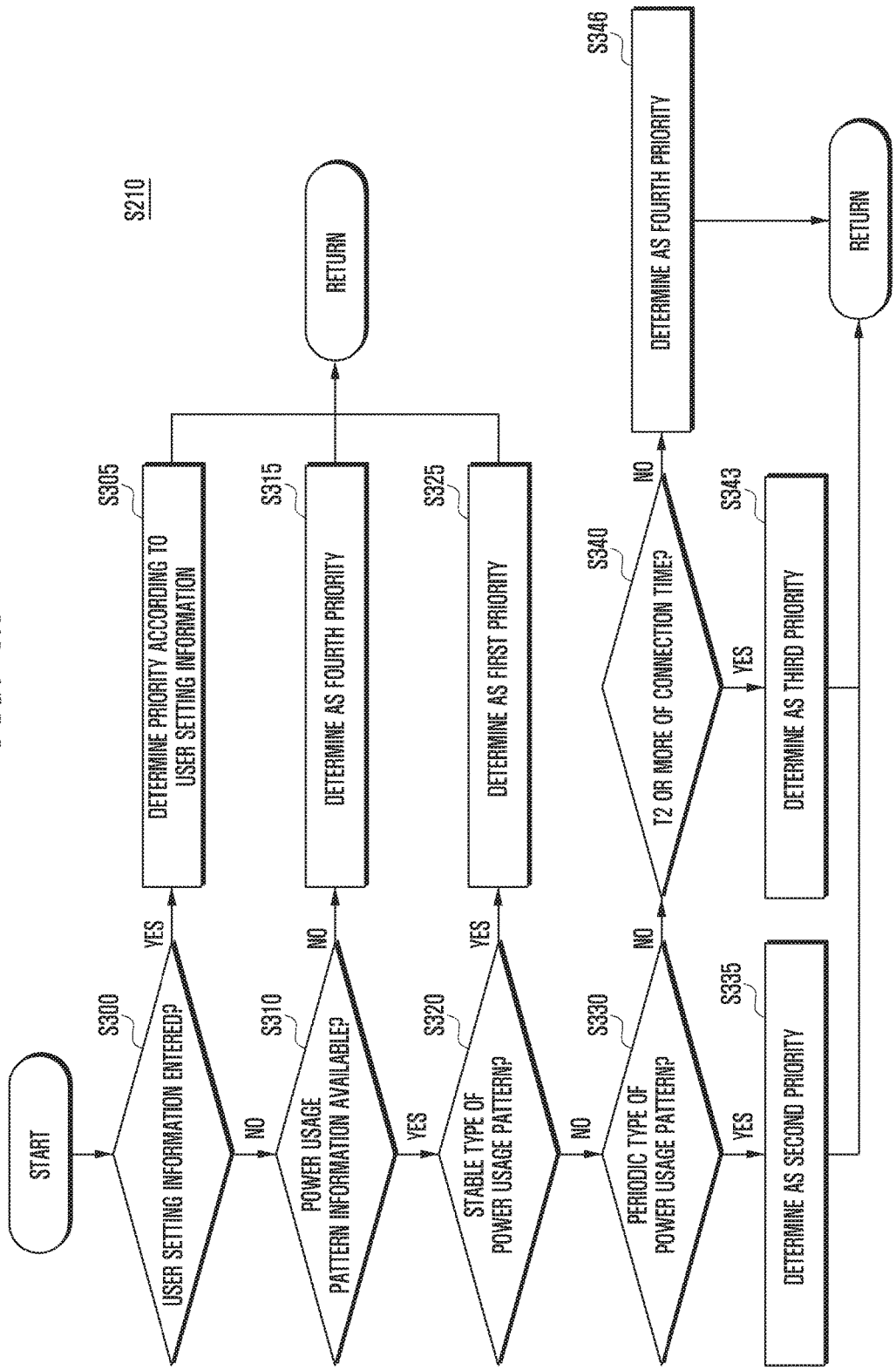

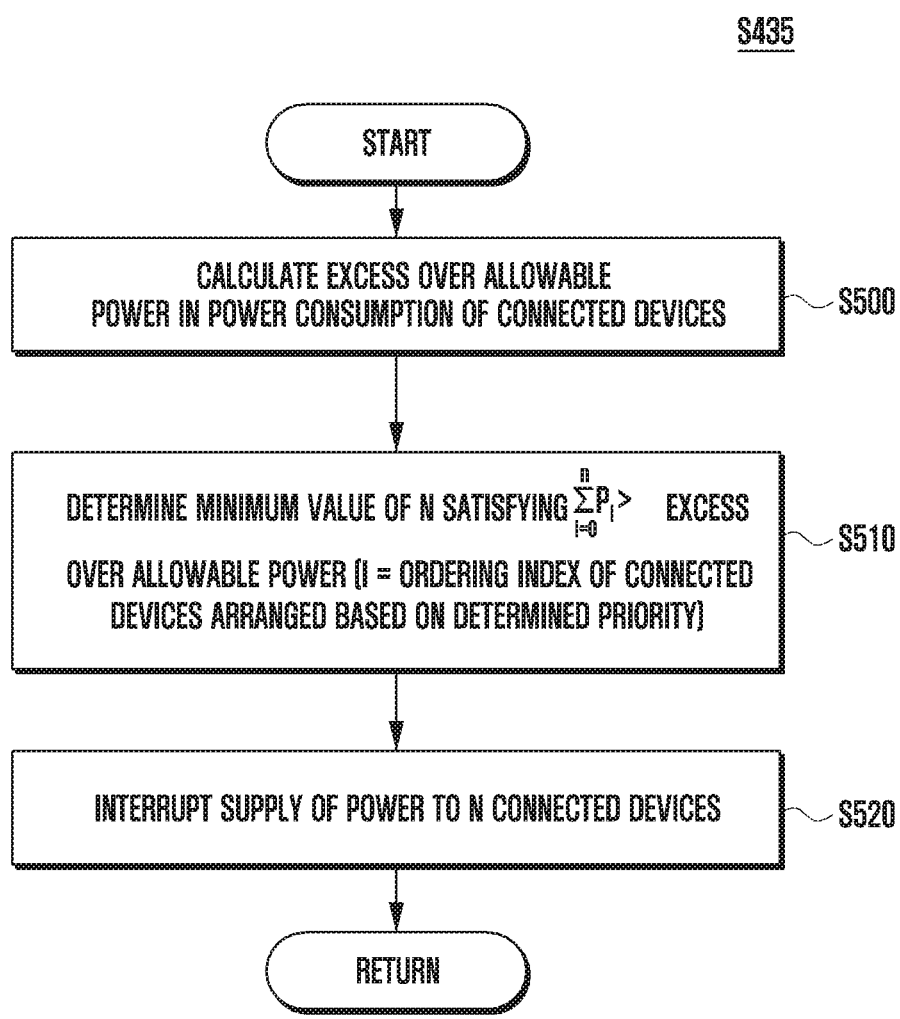

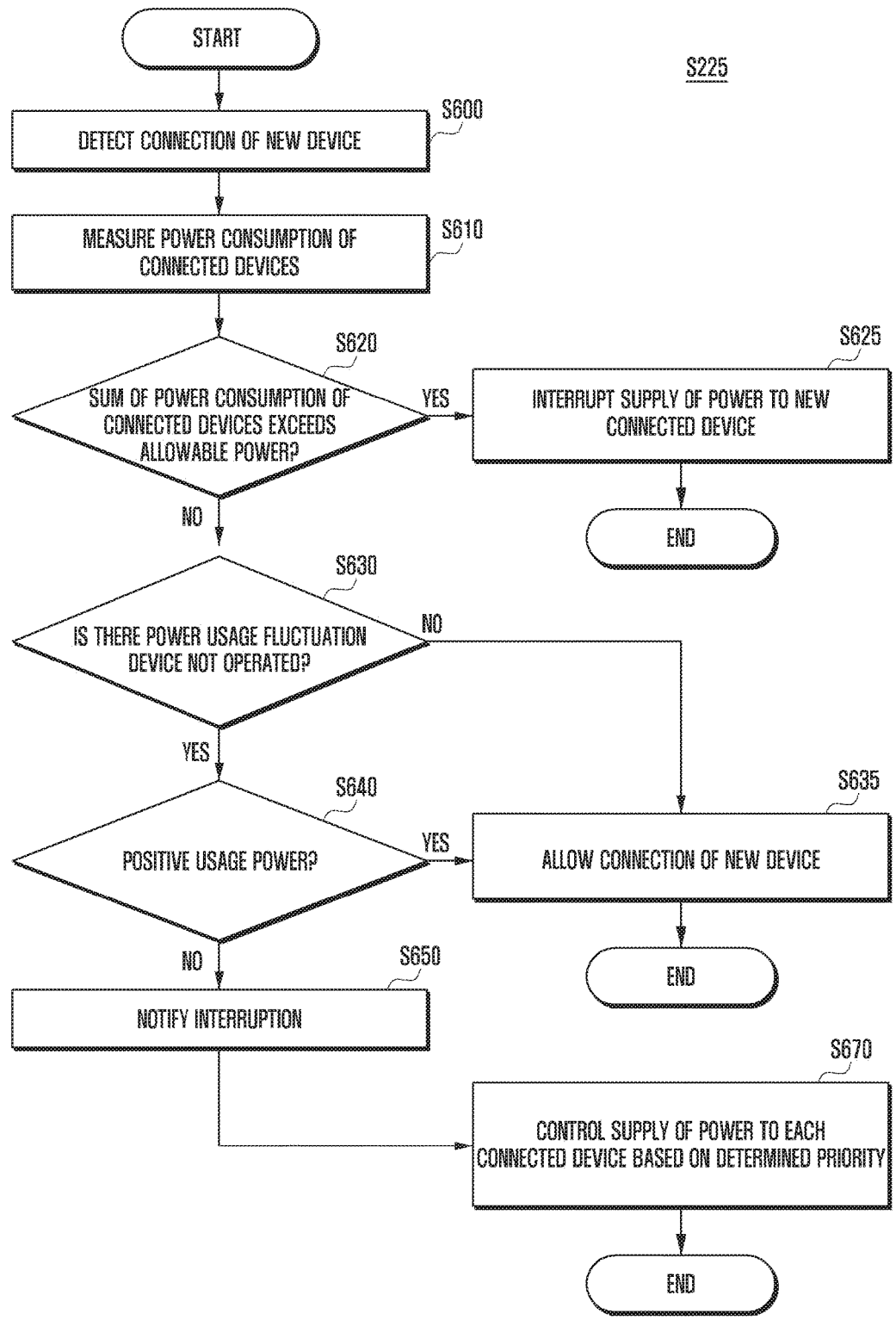

METHOD AND APPARATUS FOR CONTROLLING POWER SUPPLY

TECHNICAL FIELD

The present invention relates to power supply control and, more particularly, to a method and apparatus for simultaneously or individually supplying electric power to multiple connected devices.

BACKGROUND ART

The Internet is evolving from a human-centric network, in which humans generate and consume information, into an Internet of things (IoT) network in which distributed things exchange and process information. Further, the IoT technology combines with big data processing technology through connection with a cloud server or the like, thus developing into Internet of everything (IoE) technology. In order to realize the IoT, relevant technologies such as sensing technology, wired/wireless communication, network infrastructure, service interface technology, and security technology are required. Thus, recently, technologies such as a sensor network, machine-to-machine (M2M), and machine type communication (MTC) are studied.

In the IoT environment, an intelligent Internet technology (IT) service can be provided that collects and analyzes data generated from connected things and thereby creates new value in a human life. The IoT can be applied to fields of smart home, smart building, smart city, smart car or connected car, smart grid, health care, smart home appliance, and advanced medical service through the fusion of existing information technology (IT) and various industries.

A typical multi-receptacle equipped with multiple sockets includes a type of having a single switch that turns on or off the entire power of electric devices connected to the sockets, and another type of having multiple switches that individually turn on or off the power of the respective electric devices. Additionally, in order to prevent a fire and a device malfunction that may occur due to overheating during the supply of power to multiple devices, the multi-receptacle includes a self-interrupting function based on the allowable power. However, when the sum of the power consumption of the multiple devices exceeds the allowable power, the typical multi-receptacle interrupts simultaneously the power of the connected devices. This may often cause a sudden fluctuation of the supply of power because of not considering the characteristics of connected devices, thus resulting in user's inconvenience. Therefore, there is a need for a method of differentially controlling the supply of power in consideration of the usage characteristics of the connected devices.

DISCLOSURE OF INVENTION

Technical Problem

The present invention has been proposed in order to solve the above-described problems. Specifically, the present invention provides a method and apparatus for controlling the supply of power to a device on the basis of device usage characteristics including power consumption pattern and connection time of multiple devices connected to a multi-receptacle. In addition, the present invention provides a method and apparatus for controlling the supply of power to a device by predicting the total power consumption of multiple connected devices when a new device is connected.

Solution to Problem

According to an embodiment of the present invention, a method for managing supply of power to a device comprise steps of measuring power consumption of at least one connected device; determining a priority of each of the at least one connected device when the measured power consumption exceeds allowable power; and controlling the supply of power to each of the at least one connected device, based on the determined priority, wherein the priority of each of the at least one connected device is determined based on a power consumption pattern of the connected device and a connection time of the connected device.

According to an embodiment of the present invention, an apparatus for managing supply of power to a device comprises a communication unit configured to transmit and receive necessary information; and a controller configured to measure power consumption of at least one connected device, to determine a priority of each of the at least one connected device when the measured power consumption exceeds allowable power, and to control the supply of power to each of the at least one connected device, based on the determined priority, wherein the priority of each of the at least one connected device is determined based on a power consumption pattern of the connected device and a connection time of the connected device.

Advantageous Effects of Invention

According to embodiments of the present invention, the method and apparatus for controlling the supply of power may manage the supply and interruption of power for the connected devices in consideration of the characteristics related to the power consumption of the devices connected to the multi-receptacle, thus enhancing user's convenience. Also, managing the supply and interruption of power by estimating the power consumption of the devices connected to the multi-receptacle may prevent problems such as a failure due to power overload.

BRIEF DESCRIPTION OF DRAWINGS

FIG. 2 is a flow diagram illustrating a method for controlling the supply of power to a device according to an embodiment of the present invention.

FIG. 5 is a flow diagram illustrating a method for interrupting power for each connected device based on determined priority according to an embodiment of the present invention.

FIG. 6 is a flow diagram illustrating a method for controlling the supply of power by predicting a possibility of exceeding an allowable range, when a new device is connected, according to an embodiment of the present invention.

MODE FOR THE INVENTION

Figure 1A:
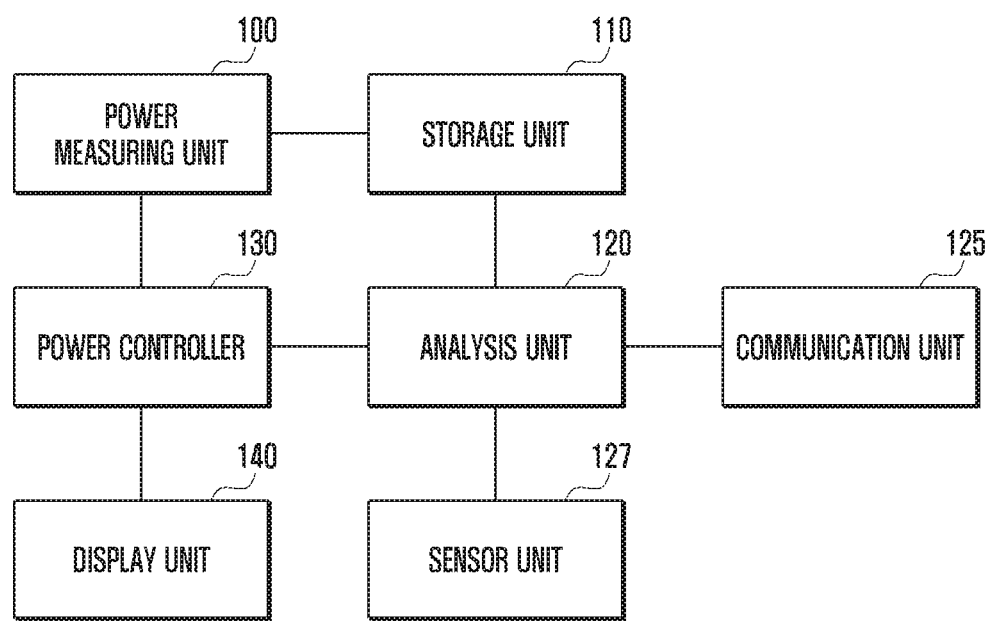
FIG. 1 is a diagram illustrating elements of an apparatus for controlling the supply of power to a device according to an embodiment of the present invention.

Hereinafter, embodiments of the present invention will be described with reference to the accompanying drawings.

In the following description of embodiments, descriptions of techniques that are well known in the art and not directly related to the present invention are omitted. This is to clearly convey the gist of the present invention by omitting an unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the present invention and the manner of achieving them will become apparent with reference to embodiments described in detail below with reference to the accompanying drawings. The present invention may, however, be embodied in many different forms and should not be construed as limited to embodiments set forth herein. Rather, these embodiments are provided so that this disclosure will be thorough and complete, and will fully convey the scope of the invention to those skilled in the art. To fully disclose the scope of the invention to those skilled in the art, and the invention is only defined by the scope of claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

FIG. 1 is a block diagram illustrating an internal structure of an apparatus for controlling the supply of power to a device according to an embodiment of the present invention.

Referring to FIG. 1A, the apparatus for controlling the supply of power to the device may include a power measuring unit 100, a storage unit 110, an analysis unit 120, a communication unit 125, a sensor unit 127, a power controller 130, and a display unit 140.

The apparatus for controlling the supply of power to the device is capable of simultaneously or individually supplying electric power to multiple connected devices, and may generally include a multi-receptacle. Namely, the multi-receptacle may include all elements of the apparatus for controlling the supply of power to the device. Alternatively, the multi-receptacle may include only the power measuring unit 100 and the display unit 140, whereas the storage unit 110, the analysis unit 120, and the power controller 130 may be located outside the multi-receptacle. Hereinafter, the apparatus for controlling the supply of power to the device according to the present invention will be described on the assumption that the apparatus is a multi-receptacle including all of the above elements unless otherwise specified. In addition to embodiments disclosed herein, other variations are possible as apparent to those skilled in the art. Further, the apparatus for controlling the supply of power to the device will be used together with the multi-receptacle.

The power measuring unit 100 may measure individual power consumption of connected devices. The power measuring unit 100 is located inside the multi-receptacle, and may measure the power consumption of each device in real time. The power consumption represents the electric power consumed by the device and is generally expressed in the unit of watts (W) or kilowatt (kW). The power measuring unit 100 may measure the electric power per hour consumed by the connected device. Also, the power measuring unit 100 may measure a connection time of each device. The connection time indicates a cumulative time after the device is connected to the multi-receptacle. The connection time may be expressed in the unit of seconds or minutes.

When the sum of power consumption measured for the connected devices exceeds the allowable power of the multi-receptacle, the power measuring unit 100 may notify this to the power controller 130. Alternatively, if the storage unit 110, the analysis unit 120, the power controller 130, and the like are located outside the multi-receptacle, the power measurement unit 100 may transmit information about the measured power consumption and the measured connection time to the outside through the communication unit.

The storage unit 110 may allocate a connection-related identity (ID) for each connected device to the connected device, and may store the power consumption and connection time of each device measured and transmitted by the power measuring unit 100. The storage unit 110 may store power consumption pattern information of each device obtained by collecting the received power consumption information according to time for each device.

In addition, the storage unit 110 may store ranking information for each connected device predetermined based on environmental information. The ranking information indicates a predetermined ranking of each connected device in case of specific environmental information. For example, if the multi-receptacle receives a fine dust warning message from a certain external server, e.g., a weather center server, or detects fine dust with given threshold or more through a sensor embedded therein, the ranking of an air cleaner among the connected devices may be determined as zero (i.e., top ranking).

In addition, the storage unit 110 may store user feedback information for each connected device. The user feedback information refers to history information indicating that the user readjusts the supply of power to the connected device when the supply of power to the connected device is controlled according to the determined ranking. For example, the user feedback information may include history information indicating that the power is supplied again to the connected device by the user when the supply of power to the connected device is interrupted according to the determined ranking. In addition, the user feedback information may include history information indicating that, when the multi-receptacle displays on the display unit the interruption of power to the connected device according to the previously determined ranking, the user enters setting information for rejecting this interruption.

The analysis unit 120 may determine the priority of each connected devices, based on information stored in the storage unit 110. The analysis unit 120 may determine the priority of each connected devices by using power consumption information of each device, connection time information of each device, ranking information of each device predetermined based on environmental information, and user feedback information for each device, which are stored in the storage unit 110. The priority of each connected device indicates the priority to be considered when electric power is supplied to each connected device. Namely, when the sum of power consumption of connected devices exceeds the allowable power of the multi-receptacle, such priorities are considered for determining the connected device for which the supply of power will be interrupted. The priority of each connected device may indicate the priority of supplying electric power.

The priorities of connected devices may be determined, for example, as integer ranking from "0" to "4". Namely, a connected device determined with ranking of "0" has the highest priority, and the supply of power will be interrupted lastly. Also, a connected device determined with ranking of "4" has the lowest priority, and the supply of power will be interrupted firstly. The above integer ranking from "0" to "4" is exemplary only and not to be construed as a limitation of the present invention. In addition, the analysis unit 120 may determine the priority of each connected device, based on information received through the communication unit 125. The analysis unit 120 may receive setting information of each connected device through the communication unit 125. The analysis unit 120 may determine the priority of each connected device, based on the user setting information, the power consumption, and the connection time, and may consider the user setting information first of all.

A user who uses the multi-receptacle may enter user setting information for devices connected to the multi-receptacle. The user setting information may include information about the type of a connected device and information about the priority of a connected device. When connecting a device to the multi-receptacle, the user may enter the type information of the connected device and further enter the priority information. Also, the user may enter in advance the priority information corresponding to the type of the connected device. The user may determine the priorities of devices connected to the multi-receptacle, using the above-mentioned integer numbers from "0" to "4". The user setting information may be received through the communication unit 125 connected to the analysis unit 120. For example, the communication unit 125 may receive the user setting information from an external administrator server. When the user directly enters the priority information of connected devices, this may be used for determining the priorities of the connected devices.

In another embodiment, the analysis unit 120 may identify the type of a connected device through the power usage amount of the device without using the type information of the connected device entered by the user. For this, using a power pattern predefined in the storage unit 110, the analysis unit 120 may analyze the power usage pattern of the connected device measured by the power measuring unit 100. If the analysis unit 120 identifies the type of the connected device through the power usage amount of the device, the priority of the connected device may be determined using the user-entered priority information corresponding to the type of the connected device. Alternatively, if the analysis unit 120 identifies the type of the connected device through the power usage amount of the device, the priority of the connected device may be determined using the priority information corresponding to the type of the connected device in an external server, e.g., a manufacturer server.

In still another embodiment, the analysis unit 120 may receive information about a provider policy including the user setting information through the communication unit 125. The provider policy is generated by collecting the priority information of each connected device determined by the user in case of a typical multi-receptacle. The provider policy may include ranking information corresponding to the connected device. In this case, the communication unit 125 may receive the provider policy from, for example, a provider server of the multi-receptacle. It is merely one embodiment that the analysis unit 120 receives the setting information of each connected device through the communication unit 125. In another embodiment, the setting information may be previously stored in the storage unit 110. The present invention is not limited to these embodiments.

In addition, the analysis unit 120 may receive the user feedback information from an administrator server or a provider server through the communication unit 125. Also, the analysis unit 120 may receive, through the communication unit 125, the ranking information for each connected device predetermined based on environmental information. The analysis unit 120 may receive the environmental information from an external server, e.g., a weather center server, through the communication unit 125. The environmental information may include weather factor information. The weather factor may include at least one of temperature, humidity, the amount of sunshine, radiant heat, airflow, or wind speed. Using the received user feedback information, the environmental information, and the ranking information predetermined for each connected device based on the environmental information, the analysis unit 120 may change and adjust the priority determined for each connected device.

The analysis unit 120 may acquire environmental information through the sensor unit 127 connected thereto. The sensor unit 910 may include, for example, a temperature sensor, a humidity sensor, an illuminance sensor, a motion detection sensor, a sound detection sensor, and the like. The environmental information may include both weather factor information and artificial environmental state information. The weather factor may include at least one of temperature, humidity, the amount of sunshine, radiant heat, airflow, or wind speed. The artificial environmental state information may include the presence or not of a user in a certain space, space characteristics, or occupant characteristics.

The power controller 130 may control the supply of power to each connected device, based on the priority of each connected device determined by the analysis unit 120. Namely, the power controller 130 may receive, from the power measuring unit 100, information about a situation in which the sum of the power consumption of devices connected to the multi-receptacle exceeds the allowable power. In this case, the power controller 130 may request the analysis unit 120 to provide the priority information of each connected device so as to control the power of the connected devices. Thereafter, when receiving the priority information of each connected device from the analysis unit 120, the power controller 130 may interrupt the supply of power to at least one of the connected devices, based on the priorities of the connected devices.

The display unit 140 may display information about a control status when the power controller 130 controls the supply of power to the connected devices. The display unit 140 may receive, from the power controller 130, information indicating a situation in which the sum of the power consumption of the connected devices exceeds the allowable power. In this case, the display unit 140 may display a warning message or change the illumination of the display unit to inform the user of such a situation.

In addition, when the power controller 130 interrupts the supply of power to any of the devices connected to the multi-receptacle, the display unit 140 may display information about the interrupted devices. If a new device is connected but if the connection of the new device is disallowed, the display unit 140 may display a message indicating that the supply of power to the new device is interrupted and the connection of the new device is disallowed.

Figure 1B:
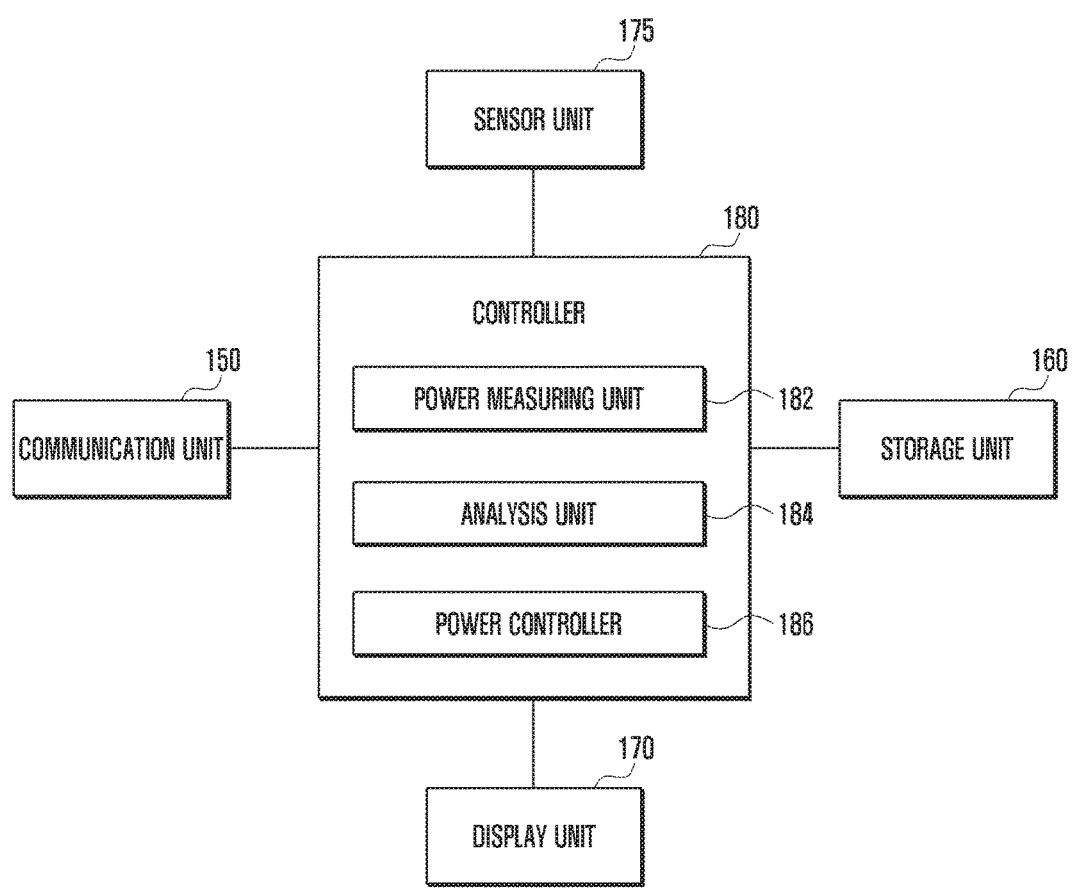

FIG. 1B is a block diagram illustrating an internal structure of an apparatus for controlling the supply of power to a device according to another embodiment of the present invention.

Referring to FIG. 1B, the apparatus for controlling the supply of power to the device may include a communication unit 150, a storage unit 160, a display unit 170, a sensor unit 175, and a controller 180, The controller 180 may include a power measuring unit 182, an analysis unit 184, and a power controller 186.

The communication unit 150 may transmit and receive information necessary for the operation of the apparatus that controls the supply of power to the device. The communication unit 150 may transmit information necessary for the controller 180 to perform the operation of the present invention. The communication unit 150 may receive information from an external server, which may include, for example, an administrator server. The information received from the external server may include user setting information. The user setting information may include information about the type of the connected device and information about the priority of the connected device. When a certain device is connected to the multi-receptacle, the user may enter the type information of the connected device and also enter the priority information. In addition, the user may previously enter the priority information corresponding to the type of the connected device.

Additionally, the external server may include a provider server, and the information received from the external server may include provider policy information. The provider policy is generated by collecting the priority information of each connected device determined by the user in case of the existing multi-receptacle. The communication unit 150 may receive the provider policy information through the provider server. In addition, the communication unit 150 may receive the priority information corresponding to the type of the connected device from the external server.

The storage unit 160 may store information necessary for the operation of the apparatus that controls the supply of power to the device. The storage unit 160 may store information necessary for the controller 180 to perform the operation of the present invention. Specifically, the storage unit 160 may allocate a connection-related identity (ID) for each connected device to the connected device, and may store the power consumption and connection time of each device measured and transmitted by the power measuring unit 182 in the controller 180. The storage unit 160 may store power consumption pattern information of each device obtained by collecting the received power consumption information according to time for each device.

The display unit 170 may display information about a control status when the power controller 186 controls the supply of power to the connected devices. The display unit 170 may receive, from the power controller 186, information indicating a situation in which the sum of the power consumption of the connected devices exceeds the allowable power. In this case, the display unit 140 may display a warning message or change the illumination of the display unit to inform the user of such a situation.

In addition, when the power controller 186 interrupts the supply of power to any of the connected devices, the display unit 170 may display information about the interrupted devices. If a new device is connected but if the connection of the new device is disallowed, the display unit 140 may display a message indicating that the connection of the new device is disallowed.

The sensor unit 175 may acquire information necessary for the controller 180 to operate. The sensor unit 175 may acquire environmental information. The sensor unit 175 may include, for example, a temperature sensor, a humidity sensor, an illuminance sensor, a motion detection sensor, a sound detection sensor, and the like. The environmental information may include both weather factor information and artificial environmental state information. The weather factor may include at least one of temperature, humidity, the amount of sunshine, radiant heat, airflow, or wind speed. The artificial environmental state information may include the presence or not of a user in a certain space, space characteristics, or occupant characteristics.

The power measuring unit 182, the analysis unit 184, and the power controller 186 included in the controller 180 may perform the operations of the power measuring unit 100, the analysis unit 120, and the power controller 130 shown in FIG. 1A, respectively. Also, the controller 180 may perform the all operations of the power measuring unit 182, the analysis unit 184, and the power controller 186.

FIG. 2 is a flow diagram illustrating a method for controlling the supply of power to a device according to an embodiment of the present invention.

Specifically, when a device is connected at step S200, the multi-receptacle, which is an apparatus for controlling the supply of power to the device, may determine the priority of each connected device at step S210. At this time, the multi-receptacle may determine the priority based on any one of setting information entered to the connected device by the user, power consumption information of the connected device, and connection time information. The multi-receptacle may determine the priority based on any one of user setting information, power consumption information and connection time information of each connected device, which are stored distinctively with the ID of the connected device in the storage unit.

The priority of each connected device indicates the priority to be considered when electric power is supplied to each connected device. Namely, when the sum of power consumption of connected devices exceeds the allowable power of the multi-receptacle, such priorities are considered for performing the operation of interrupting the supply of power to the connected device. The priorities of connected devices may be determined, for example, as integer ranking from "0" to "4". A detailed method for determining the priorities of connected devices will be described below with reference to FIG. 3.

If the sum of power consumption of connected devices exceeds the allowable power at step S220, the multi-receptacle may control the supply of power to each connected device. In this case, based on the determined priority, the power of one or some of connected devices may be interrupted. In addition, if the sum of power consumption of connected devices is measured again and if the measured sum does not exceed the allowable power, the power interruption for one or some of interrupted devices may be released. A detailed method for controlling the supply of power will be described below with reference to FIG. 4.

In addition, if a new connected device is detected at step S230, the multi-receptacle may predict a possibility of exceeding the allowable power and thereby control the supply of power to each connected device. In this case, the supply of power to connected devices including the new connected device may be controlled, depending on whether there is a power usage fluctuation device which is connected to the multi-receptacle but is not operated. A detailed description will be given below with reference to FIG. 6.

FIG. 3 is a flow diagram illustrating a method for determining priorities of connected devices according to an embodiment of the present invention.

Specifically, FIG. 3A is a diagram illustrating an embodiment of step S240 shown in FIG. 2. In the following description, it is assumed that the priorities are determined as integer ranging from "0" to "4". The multi-receptacle may determine the priorities of connected devices, based on any one of user setting information, power consumption information, and connection time information, which are stored previously with respect to the ID of each connected device in the storage unit.

Referring to FIG. 3A, at step S300, the multi-receptacle, which is an apparatus for controlling the supply of power to a device, may determine whether there is an input of user's setting information for a connected device. Also, the multi-receptacle may determine whether the user setting information is in provider policy information. The user setting information and the provider policy information may be received from an external server. The user setting information may include information about the type of a connected device and information about the priority of a connected device. When connecting a device to the multi-receptacle, the user may enter the type information of the connected device and further enter the priority information. Also, the user may enter in advance the priority information corresponding to the type of the connected device. The user may determine the priorities of devices connected to the multi-receptacle, using the above-mentioned integer numbers from "0" to "4". When the user directly enters the priority information of connected devices, this may be used for determining the priorities of the connected devices.

In another embodiment, the analysis unit 120 may identify the type of a connected device through the power usage amount of the device without using the type information of the connected device entered by the user. For this, using a predefined power pattern, the multi-receptacle may analyze the power usage pattern of the connected device. If the multi-receptacle identifies the type of the connected device through the power usage amount of the device, the priority of the connected device may be determined using the user-entered priority information corresponding to the type of the connected device. Alternatively, if the multi-receptacle identifies the type of the connected device through the power usage amount of the device, the priority of the connected device may be determined using the priority information corresponding to the type of the connected device in an external server.

If there is an input of the user setting information for the connected device, the multi-receptacle may determine the priority according to the user setting information at step S305. Namely, the multi-receptacle may preferentially consider the user setting information when determining the priority of each connected device.

If there is no input of the user setting information for the connected device, or if there is no setting information for the connected device in the provider policy, the multi-receptacle may determine at step S310 whether power usage pattern information for the connected device is available. Namely, the multi-receptacle may determine whether power consumption information for the connected device is sufficient. Regarding this, the multi-receptacle may determine whether a recorded time of power consumption greater than a certain threshold time.

The multi-receptacle may derive a power consumption pattern for the connected device with the power consumption information according to time. The power consumption pattern may include information about changes in the power consumption of the connected device according to time. The power consumption pattern may be classified into at least one of the following types.

Type 1—A type of consuming power stably
Type 2—A type of consuming power periodically
Type 3—A type of consuming power aperiodically If the power usage pattern information for the connected device is not available, namely, if it is determined that the power consumption information is not sufficient, the multi-receptacle may determine the priority of the connected device as "4" which indicates the lowest priority among the priorities of the connected devices. That is, if the power consumption information is not sufficient in the absence of the user setting information, the priority of supplying power may be determined to be low.

If it is determined that the power usage pattern information for the connected device is available, the multi-receptacle may determine at step S320 whether the power consumption pattern of the connected device corresponds to the type of consuming power stably. If the connected device has the type of stably consuming power according to time, the multi-receptacle may determine the priority of the connected device as "1" at step S325. The device having this stable type of power consumption pattern may include, for example, a refrigerator, a server, etc., which consume power continuously. Viewing from this type power usage pattern, the corresponding device may be assumed to be always needed by the user. The priority of this type device may be determined to be high so as to prevent the power from suddenly being cut off. In case of the connected device having a high priority, the multi-receptacle may determine the power of this connected device to be interrupted later even if the total power consumption of the connected device exceeds the allowable power.

At step S330, the multi-receptacle may determine whether the power consumption pattern of the connected device corresponds to the type of consuming power periodically. If the connected device has the type of periodically consuming power, the multi-receptacle may determine the priority of the connected device as "2" at step S335. The device having this periodic type of power consumption pattern may include, for example, a computer, a water purifier, a cooling fan, etc., which is operated at a certain time by the user. Like this, if the power consumption pattern derived from the accumulated power consumption information is the type of consuming power periodically at a predetermined time, the priority may be relatively high. This is because even if the allowable power is exceeded, it can be assumed that the user has a high necessity of using the connected device at the corresponding time.

If the power usage pattern of the connected device is not the type of periodically consuming power, namely, in case of corresponding to the type of aperiodically or sporadically consuming power, the multi-receptacle may determine the priority to be lower than the priority of the device having the type of periodically consuming power of the power usage pattern. The device having this aperiodic or sporadic type of power usage pattern may include, for example, a coffee pot, a portable phone charger, and the like. This is because when the allowable power is exceeded, it can be assumed that the user's need is relatively low.

In this case, the multi-receptacle may determine at step S340 whether the cumulative time of the connected device connected to the multi-receptacle is equal to or greater than T2 which corresponds to a predetermined threshold time. If the connection time is equal to or greater than the predetermined threshold time, the multi-receptacle may determine the priority of the connected device as "3" at step S343. On the other hand, if the connection time is smaller than the predetermined threshold time, the multi-receptacle may determine the priority of the connected device as "4" at step S346. Namely, in case of the connected device having the type of aperiodically or sporadically consuming power, the priority thereof may be determined on the basis of the cumulative time connected to the multi-receptacle.

If it is determined that some connected devices have the same priority, the multi-receptacle may further determine the individual priorities of such connected devices having the same priority according to power consumption, frequency of use, and connection time. Therefore, the multi-receptacle may determine the priorities of all connected device individually.

According to the above-described method, the priorities of supplying power to the connected devices are determined by considering not only the user setting information but also the power consumption pattern and the connection time of the connected devices. It is therefore possible to supply the electric power according to actual usage characteristics of the connected devices. That is, when the sum of power consumption of the connected devices connected to the multi-receptacle exceeds the allowable power, the supply of power to the connected devices is sequentially and selectively interrupted according to the determined priority. This may prevent a fatal problem of a certain connected device to be caused by interrupting the supply of power. Also, by considering the power consumption pattern and thereby preferentially supplying power to a certain connected device that uses power periodically, it is possible to increase the user's satisfaction of using the devices.

Figure 3B:
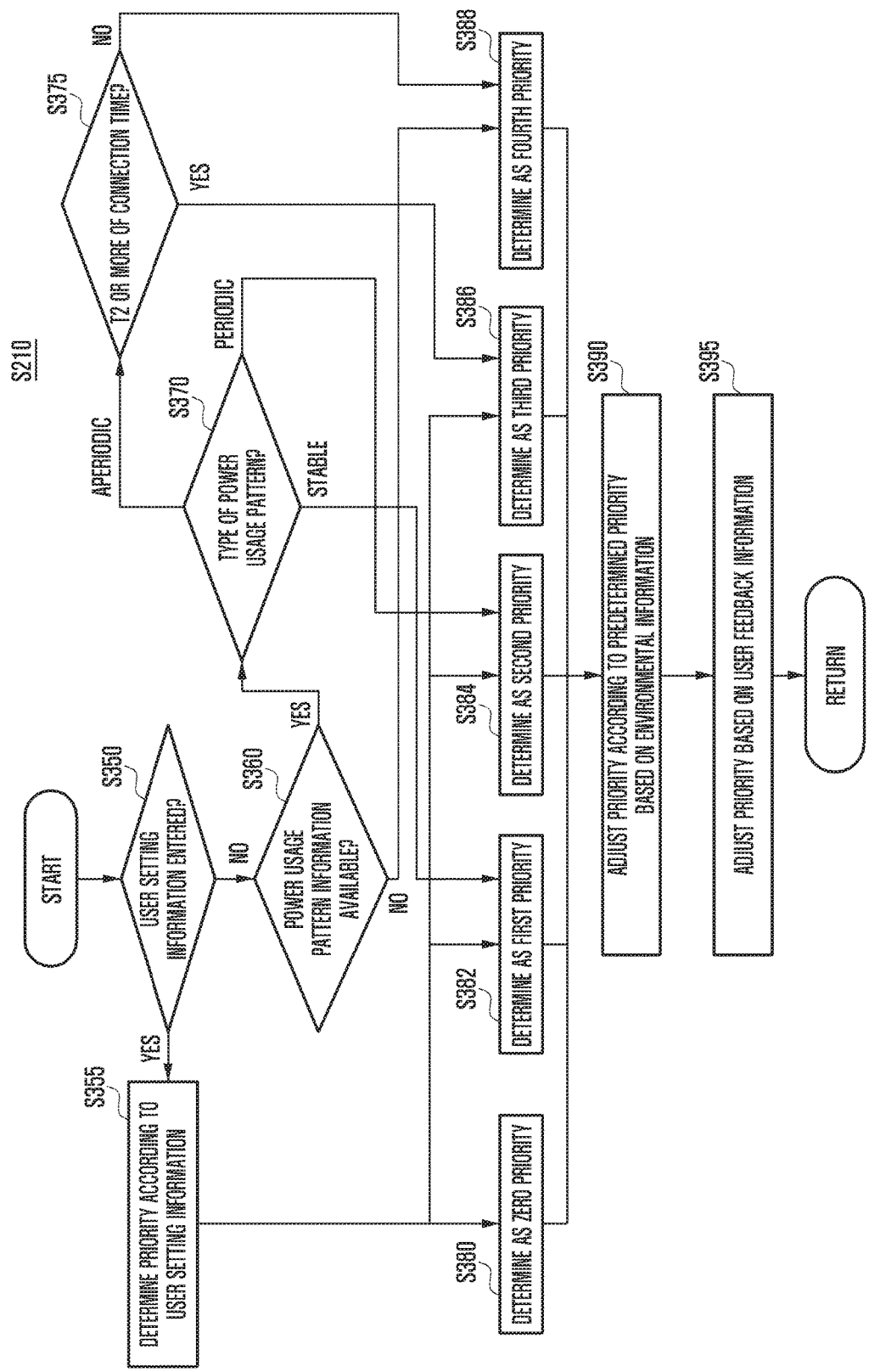
FIG. 3 is a flow diagram illustrating a method for determining priorities of connected devices according to an embodiment of the present invention.

FIG. 3B is a diagram illustrating an embodiment of step S240 shown in FIG. 2. The multi-receptacle may determine the priorities of connected devices, based on any one of the user setting information, the power consumption information, and the connection time information, which are previously stored with respect to the ID of each connected device in the storage unit. In addition, after the priorities of the connected devices are determined, the multi-receptacle may change the priorities of the connected devices, based on the user feedback information and any other surrounding information. Namely, in FIG. 3B, the method for determining the priority includes adjusting and changing the determined priority later.

At step S300, the multi-receptacle which is an apparatus for controlling the supply of power to a device may determine whether there is an input of user setting information for a connected device. Also, the multi-receptacle may determine whether the user setting information is in provider policy information. The user setting information and the provider policy information may be received from an external server.

If there is an input of the user setting information for the connected device, the multi-receptacle may determine the priority according to the user setting information at step S305. Namely, the multi-receptacle may preferentially consider the user setting information when determining the priority of each connected device. In this case, the user may set the connection device to any one of ranking "0", "1", "2", or "3", and the multi-receptacle that receives this user setting information may determine the priority of the connected devices according to the user setting information.

If there is no input of the user setting information for the connected device, or if there is no setting information for the connected device in the provider policy, the multi-receptacle may determine at step S360 whether power usage pattern information for the connected device is available. Namely, the multi-receptacle may determine whether power consumption information for the connected device is sufficient. Regarding this, the multi-receptacle may determine whether a recorded time of power consumption greater than a certain threshold time.

The multi-receptacle may derive a power consumption pattern for the connected device with the power consumption information according to time. The power consumption pattern may include information about changes in the power consumption of the connected device according to time. The power consumption pattern may be classified into at least one of the following types.

Type 1—A type of consuming power stably
Type 2—A type of consuming power periodically
Type 3—A type of consuming power aperiodically If the power usage pattern information for the connected device is not available, namely, if it is determined that the power consumption information is not sufficient, the multi-receptacle may determine the priority of the connected device as "4" which indicates the lowest priority among the priorities of the connected devices. That is, if the power consumption information is not sufficient in the absence of the user setting information, the priority of supplying power may be determined to be low.

If it is determined that the power usage pattern information for the connected device is available, the multi-receptacle may determine the priority of the connected device at steps S370 to S388 according to the type of power consumption pattern and the connection time of the connected device. These steps S370 to S388 may be the same as the above-discussed steps S320 to S346 in FIG. 3A.

First, if the connected device has the type 1, namely, the type of stably consuming power, the multi-receptacle may determine the priority of the connected device as "1" at step S382. In addition, if the connected device has the type 2, namely, the type of periodically consuming power, the multi-receptacle may determine the priority of the connected device as "2" at step S384. In addition, if the connected device has the type 3, namely, the type of aperiodically consuming power, the multi-receptacle may further determine the connection time of the connected device at step S375. If the cumulative connection time of the connected device is equal to or greater than T2, the priority of the connected device may be determined as "3". If the cumulative connection is smaller than T2, the priority of the connected device may be determined as "4".

Then, at step S390, the multi-receptacle may adjust the determined priority of the connected device, based on environmental information. The multi-receptacle may adjust the determined priority by using the environmental information received through the communication unit or acquired through the embedded sensor. The multi-receptacle may store ranking information predetermined for each connected device on the basis of the environmental information. Also, the multi-receptacle may receive such ranking information from an external server such as an administrator server or a provider server.

The predetermined ranking information indicates a predetermined ranking of each connected device in case of specific environmental information. For example, if the multi-receptacle receives a fine dust warning message from a certain external server, e.g., a weather center server, or detects fine dust with given threshold or more through a sensor embedded therein, the ranking of an air cleaner among the connected devices may be determined as "0" (i.e., top ranking). In addition, when the absence of the user is detected through the sensor of the multi-receptacle, the ranking of an air conditioner may be determined as "3". In this way, even after the priorities of the connected devices are determined on the basis of the setting information and the power usage pattern, the multi-receptacle may adjust the priorities in consideration of the environmental information. It is therefore possible to immediately apply the current environmental information to controlling the supply of power to the connected devices.

At step S395, the multi-receptacle may adjust the determined priority of the connected device, based on the user feedback information. The user feedback information may include history information indicating that the user adjusts the supply of power to the connected device when the supply of power to the connected device is controlled according to the determined priority. In addition, the user feedback information may include history information indicating that, when the multi-receptacle displays on the display unit the interruption of power to the connected device according to the previously determined priority, the user enters setting information for rejecting this interruption.

For example, when the priority of the connected device is determined as "2" or "3", the multi-receptacle may increase the determined priority based on the user feedback information. This may enhance the user's satisfaction of using the devices.

If it is determined that some connected devices have the same priority, the multi-receptacle may further determine the individual priorities of such connected devices having the same priority according to power consumption, frequency of use, and connection time. Therefore, the multi-receptacle may determine the priorities of all connected device individually.

Figure 4:
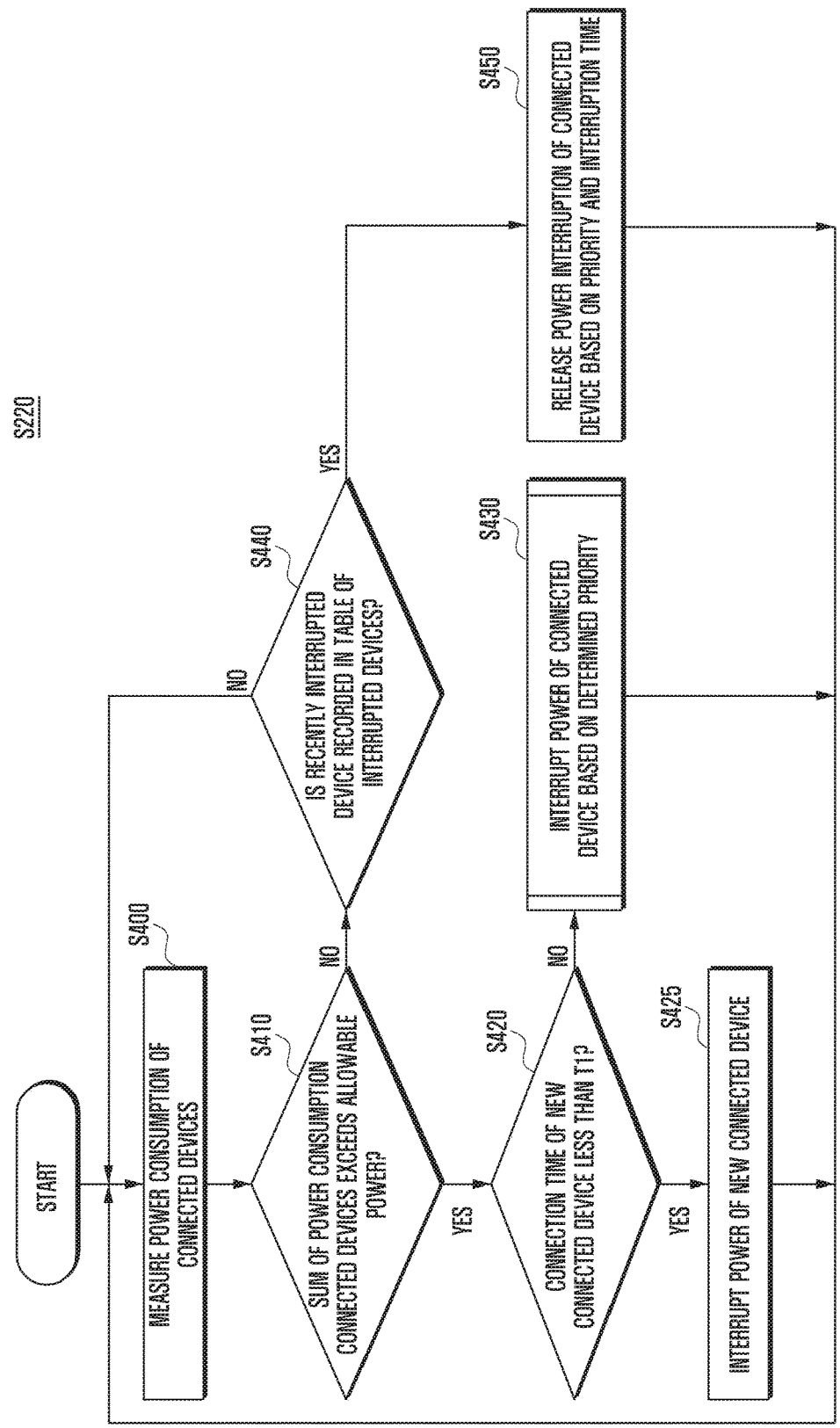
FIG. 4 is a flow diagram illustrating a method for controlling the supply of power to each connected device, when the sum of power consumption of connected devices exceeds allowable power, according to an embodiment of the present invention.

FIG. 4 is a flow diagram illustrating a method for controlling the supply of power to each connected device, when the sum of power consumption of connected devices exceeds allowable power, according to an embodiment of the present invention.

Specifically, FIG. 4 shows the details of step S220 in FIG. 2. The multi-receptacle, which is an apparatus for controlling the supply of power to the device, may measure the power consumption of the connected devices at step S400. Namely, the multi-receptacle may measure the power consumption of each device currently connected thereto. Then, at step S410, the multi-receptacle may determine whether the sum of power the consumption of the connected devices exceeds allowable power. The allowable power indicates electric power that can be supplied to the connected devices by the multi-receptacle. The allowable power may be predetermined in the unit of watts (W) or kilowatt (kW).

When the sum of the power consumption of the connected devices exceeds the allowable power, the multi-receptacle may determine at step S420 whether the connection time of a new connected device is within a specific time T1. The new connected device refers to the lastly connected device among the at least one connected devices connected to the multi-receptacle. The specific time T1 may be a predetermined threshold time. The specific time T1 is a relatively short time and may be determined as integer values from 1 second to 5 seconds. If the connection time of the new connected device is within T1, this means that there is any abnormality in the new connected device. For example, if the allowable power is exceeded within 3 seconds due to the connected device, the multi-receptacle may determine that there is an abnormality such as a short circuit or an overload in the connected device. In this case, the multi-receptacle may interrupt the power of the new connected device at step S420. Thereafter, the multi-receptacle may return to step S400 to measure again the power consumption of the connected devices.

If the connection time of the new connected device is not within T1, the multi-receptacle may interrupt the power of the connected device at step S435, based on the priority determined for each connected device. The priority of each connected device indicates the priority determined at step S210 of FIG. 2 and is determined through operations fully described in FIGS. 3A and 3B.

The multi-receptacle may determine, based on the determined priority, whether to interrupt the supply of power to the device connected thereto. In the following description, it is assumed that the priorities for the connected devices are determined as integer ranking from "0" to "4". A connected device determined with ranking of "0" has the highest priority, and the supply of power will be interrupted lastly. In addition, a connected device determined with ranking of "9" has the lowest priority, and the supply of power will be interrupted firstly. Considering individual priorities of the connected devices, even which have the same ranking, the multi-receptacle may interrupt the supply of power sequentially and selectively.

When controlling the supply of power to each connected device based on the determined priority, the multi-receptacle may determine, based on excess over allowable power, whether to interrupt the supply of power to each of the connected devices. In this case, the multi-receptacle may interrupt the supply of power to one connected device having the lowest priority. Thereafter, the multi-receptacle may return to step S400 and measure again the power consumption of the connected devices. Namely, by periodically repeating the operations shown in FIG. 4, the multi-receptacle may monitor whether the total power consumption of the connected devices exceeds the allowable power.

In another embodiment, the multi-receptacle may control the supply of power by determining the number of connected devices to be power-interrupted based on the excess over allowable power. A detailed method will be described below with reference to FIG. 4.

When the supply of power to the connected device is interrupted based on the priority at step S435, the multi-receptacle may record information about the interrupted device in "a table of interrupted devices". This information of the interrupted device may include a device ID, a priority of the device, an interruption time, and a power consumption.

If it is determined at step S410 that the sum of the power consumption of the connected devices does not exceed the allowable power, the multi-receptacle may determines at step S440 whether any recently interrupted device is recorded in the interrupted device table. If there is no recently interrupted device in the interrupted device table, the multi-receptacle may return to step S400 and measure again the power consumption of the connected devices. Namely, by periodically repeating the operations shown in FIG. 4, the multi-receptacle may monitor whether the total power consumption of the connected devices exceeds the allowable power.

If any recently interrupted device is recorded in the interrupted device table, the multi-receptacle may release the power interruption of the connected device at step S450, based on the priority and interruption time of the interrupted device. Specifically, the device may determine whether there is a device interrupted within a predetermined time among the recently interrupted device(s). If so, the multi-receptacle may calculate an allowable margin through a difference between the allowable power of the multi-receptacle and the total power consumption of the current connected devices. By comparing the allowable margin with the power consumption of each device, the multi-receptacle may select the device to be interruption-released.

When select the device to be interruption-released, the multi-receptacle may consider the priority and interruption time of each connected device. Namely, the multi-receptacle may preferentially consider the priority, if the priority expressed by integers from "0" to "4" are the same, may further consider the interruption time so as to select the device to be interruption-released. Then, the multi-receptacle may release the power interruption of the selected device and supply the power again. Thereafter, the multi-receptacle may return to step S400 to measure again the power consumption of the connected devices and then determine at step S210 whether the sum of the power consumption of the connected devices exceeds the allowable power. Namely, by periodically repeating the above-discussed operations, the multi-receptacle may monitor whether the total power consumption of the connected devices exceeds the allowable power.

FIG. 5 is a flow diagram illustrating a method for interrupting power for each connected device based on determined priority according to an embodiment of the present invention.

FIG. 5 shows the details of step S435 in FIG. 4. The multi-receptacle, which is an apparatus for controlling the supply of power to the device, may calculate the excess over allowable power in the power consumption of the connected devices at step S500.

At step S510, the multi-receptacle may determine the minimum value of n which satisfies $$\sum_{i=0}^{n} P_i > \text{excess over allowable power.}$$

Here, the subscript "i" indicates the ordering index of connected devices arranged based on the determined priority of each connected device in FIG. 3. The ordering index may be represented by an integer starting from 0 in the ascending order from the connected device with lower priority to the connected device with higher priority. Also, Pi represents the power consumption of the connected device having the ordering index of i. For example, when $P_1$ is 100 kW, $P_2$ is 50 kW, $P_3$ is 150 kW, and the excess over allowable power is 130 kW, the value of n satisfying the above equation is 2.

At step S520, the multi-receptacle may interrupt the supply of power to the n connected devices. Namely, the multi-receptacle may interrupt the supply of power to the minimum number of connected devices for recovering the excess over allowable power. In case of determining the interruption through the method shown in FIG. 5, it is possible to prevent a state where the power consumption continuously exceeds the allowable power due to interruption of only one connected device in spite of having to interrupt two connected devices to recover the excess over allowable power. Also, by deriving the minimum number of connected devices which should be power-interrupted, based on the excess over allowable power, it is possible to prevent user's inconvenience from being caused due to unnecessary interruption of many connected devices.

FIG. 6 is a flow diagram illustrating a method for controlling the supply of power by predicting a possibility of exceeding an allowable range, when a new device is connected, according to an embodiment of the present invention.

Specifically, the multi-receptacle, which is an apparatus for controlling the supply of power to the device, may detect the connection of a new device at step S600. The multi-receptacle may measure the power consumption of the connected devices at step S610. In addition, at step S620, the multi-receptacle may determine whether the sum of the power consumption of the connected devices exceeds the allowable power. When the sum of the power consumption of the connected devices exceeds the allowable power because of the connection of the new device, the multi-receptacle may interrupt the supply of power to the new device at step S625.

If the sum of the power consumption of the connected devices including the new device does not exceed the allowable power even if the new device is connected, the multi-receptacle may determine at step S630 whether there is a power usage fluctuation device that is not operated. The power usage fluctuation device may represent a device whose power consumption varies according to time. In addition, the power usage fluctuation device may include a device having a type of periodical power consumption pattern. The multi-receptacle may determine whether there is such a power usage fluctuation device among the connected devices.

In addition, based on the power consumption information and the connection time information for each connected device according to the connected device ID stored in the storage unit, the multi-receptacle may predict whether the power usage fluctuation device may be connected within a predetermined time.

If there is no power usage fluctuation device that is not operated, the multi-receptacle may allow the connection of a new device at step S635. Namely, the electric power may be supplied to the new device. If it is determined that there is a power usage fluctuation device that is not operated, the multi-receptacle may determine at step S640 whether the available power is positive. The available power may be derived in consideration of the power consumption of the power usage fluctuation device. The available power is calculated by the following equation.

$$E_{available} = E_{lim} - (E_{total} + E_{current} + E_{variable})$$ [Equation 1]

$E_{lim}$: Allowable power of multi-receptacle
$E_{total}$: Current power consumption of connected devices
$E_{current}$: Power consumption of new device
$E_{variable}$: Power consumption of power usage fluctuation device If the available power is zero or positive, the multi-receptacle may allow the connection of the new device at step S635, namely, may supply power to the new device. On the other hand, if the available power is negative, the multi-receptacle may notify the interruption at step S650. Namely, the multi-receptacle may inform the possibility of interruption through the display unit thereof.

In addition, the multi-receptacle may further determine whether the available power amount is equal to or greater than a predetermined threshold value. Namely, the multi-receptacle may permit the connection of the new device at step S635 when the available power is equal to or greater than the predetermined threshold value, and may notify the interruption at step S650 when the available power amount is less than the predetermined threshold value.

If the new connected device is not disconnected within a specific time even when the user is notified of the possibility of interruption, the multi-receptacle may control the supply of power to each connected device at step S670, based on the determined priority.

The specific time may correspond to a predetermined time. Also, the specific time may be a predicted time when the non-operated power usage fluctuation device will be operated. Namely, the operating time of the power usage fluctuation device may be periodically predicted based on the power consumption pattern according to the power consumption information stored in advance in the multi-receptacle. Therefore, if the new connected device is not disconnected within the operation-predicted time, the multi-receptacle may perform the operation of step S670.

At step S670, the multi-receptacle may interrupt the supply of power to each connected device as in step S435 of FIG. 4. This follows the operation of step S435 of FIG. 4 and the detailed operation shown in FIG. 5. In addition, the multi-receptacle may measure the power consumption of the connected devices after the power interruption of each connected device at step S670, and then determine whether the sum of the power consumption of the connected devices exceeds the allowable power as shown in FIG. 4. If the sum of the power consumption of the connected devices does not exceed the allowable power, the multi-receptacle may select a device among the interrupted devices and release the power interruption as described above in FIG. 4.

In addition, if the available power is negative, the multi-receptacle may notify the power interruption or selectively control the supply of power to each connected device, based on the priority determined for each connected device.

While the present invention has been particularly shown and described with reference to exemplary embodiments thereof, it is clearly understood that the same is by way of illustration and example only and is not to be taken in conjunction with the present invention. It will be understood by those skilled in the art that various changes in form and details may be made therein without departing from the subject matter and scope of the present invention.

The invention claimed is:

1. A method for managing supply of power to a device executed by an apparatus, comprising:
    measuring power consumption of at least one device connected to the apparatus;
    determining a priority of each of the at least one device, in case that the measured power consumption exceeds allowable power; and
    controlling the supply of power to each of the at least one device, based on the determined priority,
    wherein the priority of each of the at least one device is determined based on a power consumption pattern of the at least one device and a connection time of the at least one device.

2. The method of claim 1, further comprising:
    determining whether the connection time of a new device is less than a first threshold time, in case that the measured power consumption exceeds the allowable power; and
    interrupting the supply of power to the new device, in case that the connection time of the new device is less than the first threshold time.

3. The method of claim 1, further comprising:
    receiving at least one of an input of setting information for priority, user feedback information and predetermined priority information based on environmental information for the at least one device, and
    wherein the priority of each of the at least one device is determined by preferentially considering the setting information for priority in case that the input of the setting information is received, or determined by further considering at least one of the user feedback information and the predetermined priority information based on the environmental information for the at least one device.

4. The method of claim 1, wherein the power consumption pattern includes at least one of a type of stably consuming power, a type of periodically consuming power, and a type of aperiodically consuming power, and
    wherein the priority of each of the at least one device is determined by considering the connection time, in case that the type of each of the at least one device is the type of aperiodically consuming power.

5. The method of claim 1, wherein the controlling the supply of power to each of the at least one device includes:
    calculating an excess over the allowable power in the measured power consumption;
    determining, based on the calculated excess and the determined priority, the number of devices to be power-interrupted; and
    interrupting the supply of power to the device according to the determined number of the devices.

6. The method of claim 1, further comprising:
determining whether there is a power usage fluctuation device, in case that the measured power consumption is within the allowable power;
calculating available power in case that there is the power usage fluctuation device; and
determining the priority of each of the at least one device in case that the calculated available power is less than a predetermined value, and controlling the supply of power to the each of the at least one device based on the determined priority,
wherein the available power is calculated based on maximum power consumption of the power usage fluctuation device, and
wherein the power usage fluctuation device consumes power according to a power consumption pattern in which the power consumption changes periodically.

7. The method of claim 6, wherein the controlling the supply of power to the each of the at least one device performs the supply of power to all of the at least one device, in case that the available power is equal to or greater than the predetermined value.

8. The method of claim 1, wherein the controlling the supply of power to the each of the at least one device includes:
interrupting the supply of power to the at least one device; and
determining a device to be interruption-released in the at least one power-interrupted device in case that the power consumption measured after the power interruption does not exceed the allowable power, and then releasing the power interruption of the determined device, and
wherein the device to be interruption-released is determined based on at least one of the determined priority and an interruption time.

9. An apparatus for managing supply of power to a device, comprising:
a controller configured to:
measure power consumption of at least one device connected to the apparatus,
determine a priority of each of the at least one device, in case that the measured power consumption exceeds allowable power, and
control the supply of power to each of the at least one device, based on the determined priority,
wherein the priority of each of the at least one device is determined based on a power consumption pattern of the at least one device and a connection time of the at least one device.

10. The apparatus of claim 9, wherein the controller is further configured to:
determine whether the connection time of a new device is less than a first threshold time, in case that the measured power consumption exceeds the allowable power, and
interrupt the supply of power to the new device, in case that the connection time of the new device is less than the first threshold time.

11. The apparatus of claim 9, further comprising:
a communication unit configured to receive at least one of an input of setting information for priority, user feedback information and predetermined priority information based on environmental information for the at least one device, and
wherein the priority of each of the at least one device is determined by preferentially considering the setting information for priority in case that the input of the setting information is received, or determined by further considering at least one of the user feedback information and the predetermined priority information based on the environmental information for the at least one device.

12. The apparatus of claim 9, wherein the power consumption pattern includes at least one of a type of stably consuming power, a type of periodically consuming power, and a type of aperiodically consuming power, and
wherein the priority of each of the at least one device is determined by considering the connection time, in case that the type of each of the at least one device is the type of aperiodically consuming power.

13. The apparatus of claim 9, wherein the controller is further configured to calculate an excess over the allowable power in the measured power consumption, determine, based on the calculated excess and the determined priority, the number of devices to be power-interrupted, and interrupt the supply of power to the device according to the determined number of the devices,
wherein the controller is further configured to interrupt the supply of power to the at least one device, determine a device to be interruption-released in the at least one power-interrupted device in case that the power consumption measured after the power interruption does not exceed the allowable power, and to release the power interruption of the determined device, and
wherein the device to be interruption-released is determined based on at least one of the determined priority and an interruption time.

14. The apparatus of claim 9, wherein the controller is further configured to determine whether there is a power usage fluctuation device, in case that the measured power consumption is within the allowable power, calculate available power in case that there is the power usage fluctuation device, determine the priority of each of the at least one device in case that the calculated available power is less than a predetermined value, and control the supply of power to the each of the at least one device based on the determined priority,
wherein the available power is calculated based on maximum power consumption of the power usage fluctuation device, and
wherein the power usage fluctuation device consumes power according to a power consumption pattern in which the power consumption changes periodically.

15. The apparatus of claim 14, wherein the controller is further configured to supply power to all of the at least one device, in case that the available power is equal to or greater than the predetermined value.

* * * * *